United States Patent [19]

deRidder

[11] 3,940,280

[45] Feb. 24, 1976

[54] CONCENTRATE FOR LIQUID COATING COMPOSITION FOR METAL SUBSTRATES

[75] Inventor: Jon A. deRidder, Ashtabula, Ohio

[73] Assignee: Diamond Shamrock Corporation, Cleveland, Ohio

[22] Filed: Feb. 25, 1974

[21] Appl. No.: 445,491

Related U.S. Application Data

[63] Continuation of Ser. No. 246,154, April 21, 1972, abandoned.

[52] U.S. Cl. .............................. 106/193 M; 252/512
[51] Int. Cl.$^2$... C08L 1/28; 106 190;193;193 M;204
[58] Field of Search .............. 148/6.2; 252/512, 513

[56] References Cited
UNITED STATES PATENTS

| | | | |
|---|---|---|---|
| 2,576,307 | 11/1951 | Nordon | 106/84 |
| 2,736,665 | 2/1956 | Rogers | 106/193 |
| 2,904,523 | 9/1959 | Hawkins | 260/8 |
| 2,988,455 | 6/1961 | Rosenberg | 106/197 C |
| 3,189,488 | 6/1965 | Schiffman | 148/6.2 |
| 3,318,716 | 5/1967 | Schuster | 106/287 R |
| 3,475,185 | 10/1969 | Freyhold | 106/14 |
| 3,671,331 | 6/1972 | Malkin | 148/6.2 |
| 3,849,141 | 11/1974 | Palm | 106/14 |

*Primary Examiner*—Theodore Morris
*Attorney, Agent, or Firm*—John J. Freer

[57] ABSTRACT

A coating composition is prepared, typically, from a liquid composition precursor component to which there is added a concentrate adapted for blending with such precursor component. The concentrate contains pulverulent metal and a very minor amount of water-soluble cellulose ether, while preferably further containing water-dispersible organic liquid. The precursor component is exemplified by a solution of an inorganic acid such as chromic acid in water.

18 Claims, No Drawings

CONCENTRATE FOR LIQUID COATING COMPOSITION FOR METAL SUBSTRATES

This is a continuation of application Ser. No. 246,154, filed Apr. 21, 1972, and now abandoned.

BACKGROUND OF THE INVENTION

Pulverulent metal has heretofore been blended, for example in a chromic acid liquid medium, to obtain a coating for application to metal substrates. This can provide corrosion resistance for the substrate as has been disclosed in U.S. patent application Ser. No. 96,967. The coating compositions are typically dispersions of pulverulent metal powder or metal flake in water or t-butanol. Such compositions that are characterized by being substantially water based and containing metallic flake can be improved through blending with a high boiling organic liquid. This will enhance coating characteristics for example, as has been discussed in U.S. patent application Ser. No. 173,243.

Compositions of typically aluminum flake, a polymeric glycol plus wetting agent have been taught in U.S. Pat. No. 3,318,716. These concentrates, usually in paste or liquid form, may be used in small amounts as anti-foaming and pigmenting compositions. The paste or liquid is added to coating compositions such as dispersions of resin in water. These resin-containing coating compositions, and other similar compositions shown for protecting metal substrates, can also contain, for example, inorganic compounds such as phosphoric acid or molybdic acid, or metal salts of such acid. These inorganic compounds are also useful in combination in coating compositions with a particulate material, e.g., aluminum powder, as has been shown in U.S. Pat. No. 3,248,251.

SUMMARY OF THE INVENTION

Pigment concentrates such as the above discussed compositions disclosed in U.S. Pat. No. 3,318,716, can be useful to impart minor amounts of pigment to a coating composition. They also will exhibit anti-foaming properties when so used. However, when the particulate metal is used in the coating composition in heavy doses, as disclosed in the above mentioned patent application, Ser. No. 96,967, such particulate metal offers a desirable combination of coating characteristics going beyond pigmentation. When coating characteristics are further enhanced by blending an augmented amount of particulate metal flake into an aqueous medium and often with other coating liquids, and even when such blending is accompanied by the addition of minor amounts of wetting agents, a foaming problem is again encountered.

An improved composition is now provided which may be used in concentrated form and in such form can readily be blended with other liquid coating composition ingredients while exhibiting excellent foam suppression during blending. Such a concentrate composition will also provide aqueous-based liquid coating compositions that can be applied to a substrate, including application by dip-coating, and on analysis of the fresh coating and analysis of the coating bath, will show a desirably close parallel relationship in regard to coating ingredient concentrations in the bath and the freshly applied coating. This is particularly difficult to achieve, e.g., in dip coating, from baths containing augmented concentrations of particulate metal.

Broadly, the present invention relates to a composition concentrate adapted for blending with a liquid coating precursor and forming a liquid coating composition for application to a metal substrate, the concentrate containing, exclusive of liquid medium, between about 0.1–3 weight percent of watersoluble cellulose ether and pulverulent metal flake.

The invention is also directed to such concentrates that contain water-dispersible organic liquid and have a weight ratio of the metalic flake to the organic liquid of from about 1:4 to about 4:1, wherein the water-dispersible organic liquid in a high boiling organic compound having a boiling point above 100°C at atmospheric pressure.

The present invention is further directed to the preparation of coating compositions using such composition concentrate as well as to the aqueous coating compositions and applied coatings thereby obtained.

The substrates contemplated by the present invention for coating with a coating composition are the metal substrates to which typically an inorganic acid plus pulverulent metal in a liquid coating may or can be applied for enhancing corrosion resistance of such substrate metals, although other substrates may be coated. For convenience, the high boiling organic compound, as described more particularly hereinafter, if often termed herein simply as the "high boiling hydrocarbon".

DESCRIPTION OF THE PREFERRED EMBODIMENTS

The water-soluble cellulose ethers, and most especially those of commercial importance, can be classified into the ionic type such as sodium carboxymethycellulose, and the anionic. This later includes the hydroxyalkyl ethers as exemplified by hydroxyethylcellulose, as well as the alkyl type as exemplified by methylcellulose. Although the ionic type are the most hydrophylic they may be subject to precipitation from solution in the presence of metal ions. Thus, especially in regard to aqueous coating compositions prepared from chromic acid, the non-ionic cellulose ethers are preferred. Further, the hydroxyalkyl ethers are particularly preferred owing to their more ready solubility in cold, as well as hot water.

The water-soluble cellulose ethers are recognized industrially primarily as thickeners, e.g., in latex paints and adhesive compositions. It has also been recognized that especially the alkyl ethers are somewhat surface-active and ostensibly in view of this activity at least some of these ethers in general are useful without inducing or augmenting a foam problem. It is however recognized that such ethers may exhibit surface activity, particularly in an aqueous medium, and can thus tend to cause foaming trouble in such systems. In these instances antifoaming agents may be recommended.

In work bearing upon the scope of this particular invention, it has been observed that surface active agents, including non-ionic surface active agents, were capable of only minimal activity, rather than severely suppressing foam formation during preparation of aqueous coating compositions. Thus, liquid modified polyethoxy adducts of polyethers, and even in amounts of up to 5 volume percent, although enhancing dispersibility of composition ingredients, were found to be incapable of desirable foam suppression.

Thus, taking all of this into account, the action of the water-soluble cellulose ethers as foam reducers, and especially the drastic reduction that was achieved, during preparation of the coating compositions, was quite unexpected.

For economy, the coating composition preferably contains below about 3 weight percent, based on the total weight of the coating composition, of water-soluble cellulose ether. To enhance foam suppression such composition contains the cellulose ether in an amount greater than about 0.01 weight percent, also based on the total weight of the coating composition. Where preparation of the coating composition involves blending a composition concentrate into a water-based coating precursor, such concentrate contains, exclusive of any water, between about 0.1–3 weight percent of the water-soluble cellulose ether. This has been found to provide advantageous amounts of the cellulose ether in the finally prepared aqueous coating composition, while insuring against the presence of above about 3 weight percent of such ether. Preferably, for efficiency and economy, the water-soluble cellulose ether is one of hydroxyethylcellulose, methylcellulose, methylhydroxypropylcellulose, ethylhydroxyethylcellulose, methylethylcellulose or mixtures of these substances.

The formation of the concentrate provides material adapted for blending with an aqueous coating composition precursor. This blending forms the coating composition for application to a metal substrate. The composition precursor is typically a composition that is useful for application to a metal substrate, even in the absence of blending with the concentrate. For example, the composition can be simply a solution of chromic acid in water. As has, for example, been taught in U.S. Pat. No. 3,351,504, such an aqueous solution is useful for forming a film on the surface of a metal substrate for subsequently bonding thereto thermoplastic materials that would otherwise be difficult to bond to the metal.

It has however, been noted that when aqueous composition precursors are maintained at a pH below about 2.5, they will tend to establish, when the water-soluble cellulose ether is not present in the blending operation, slightly greater evolution of foam and/or a more stable foam. Thus, where such aqueous compositions are being utilized in the present invention, the presence of the water soluble cellulose ether is especially advantageous.

The liquid compositions to which the concentrate is to be added are intimate mixtures in liquid medium of a water soluble inorganic compound, an example of which has been mentioned hereinabove. The compound should provide, as a major amount of the compound in solution, a substance of chromium, although it is contemplated that minor amounts, e.g., 25 weight percent or less of such compound, can be contributed by solutions such as molybdic acid. Of especial interest are hexavalent-chromium-containing aqueous compositions most always containing chromic acid as the major hexavalent-chromium-providing substance. Although these aqueous compositions of particular interest might contain only a small amount, e.g., 5 grams per liter of hexavalent chromium, expressed as $CrO_3$, and may contain as much as about 100 grams per liter of composition of hexavalent chromium, expressed as $CrO_3$, such compositions such compositions typically contain from about 10 up to about 60 grams per liter of hexavalent chromium, expressed as $CrO_3$.

For supplying the liquid medium, water supplies the preponderant amount of the liquid medium with preferably only a very minor amount of the medium being other liquid material. Thus, the aqueous mediums typically contain less than about 10 percent of other liquids, i.e., t-butanol and inert organic liquids, e.g., such liquids as are not readily oxidized in organic acid solution, including halogenated hydrocarbon liquid, some of which have been discussed in U.S. Pat. Nos. 2,762,732 and 3,437,531. A substantial amount of liquid in an aqeous liquid medium, i.e., up to 50 volume percent based on the total volume of liquid in the aqueous medium, can however, be supplied by water dispersible organic liquid. Such organic liquid, when present, also supplies substantially above about 5 volume percent, on a similar basis, of such total liquid.

It is most important that this high boiling organic compound have a boiling point at atmospheric pressure above 100°C. The organic compound should also be easily dispersible in water and preferably water soluble. Such organic compounds as are used are those that are retained during baking on the coated substrate in sufficient amount and duration to permit participation of the hydrocarbon in the formation of a coating. This participation can be exemplified in the coating by reduction of chromium in the coating from hexavalent to the trivalent state.

The organic compounds contain carbon, oxygen and hydrogen and have at least one oxygen-containing constituent that may be hydroxyl, or oxo, or a low molecular weight ether group, i.e., a $C_1$–$C_2$ ether group. Since water dispersibility and preferably water solubility is sought, polymeric hydrocarbons are not particularly suitable and advantageously serviceable hydrocarbons contain less than about 15 carbon atoms. Particular hydrocarbons which may be present in the aqueous coating composition include di- and tripropylene glycol, the monomethyl, dimethyl, and ethyl ethers of these glycols, as well as diacetone alcohol, the low molecular weight ether of diethylene glycol, and mixtures of the foregoing.

The pulverulent metal flake, e.g., zinc flake or aluminum flake, or mixtures of such flakes, but preferably for galvanic protection and coatability, are most typically such pulverulent metals having a thickness on the order of 0.1–0.3 microns and most typically a size in the longest dimension of not substantially above about 15 microns. Aluminum flake, also sometimes termed leafing aluminum pigment, has been discussed, for example, in U.S. Pat. No. 2,312,088. Flake may be blended with pulverulent metal powder, but typically in only minor amounts of the powder, and such powder should have particle size so that all particles pass 100 mesh and a major amount pass 325 mesh ("mesh" is used herein as U.S. Standard Sieve Series). The powders are generally spherical as opposed to the leafing characteristic of the flake.

The coating compositions of particular interest contain an amount of pulverulent metal that does not exceed about 500 grams of metal per liter of coating composition liquid medium. More than this can add expense without a significant increase in protection for the coated substrate.

Such coating compositions may be applied to the metal substrate by any conventional method for coating a substrate with a liquid, for example, dip coating, roller coating or reverse roller coating, or combinations of techniques as, for example, spray and brush techniques. Typically the composition is applied by simply dipping the article into the composition. The metal surface can be a preheated metal surface to assist in the curing of the composition, or the coating composition may be applied from a heated bath, for example, one heated up to 200°F.

The coating composition should contain some, and generally contains up to, for example, about 0.05 volume percent, basis total composition liquid, of a surface active agent. Such agent may be present in as little as 0.0005 volume percent, also on a total liquid basis. The agents for effecting pulverulent metal dispersibility are polyethoxy adducts, exemplified by the alkylphenoxypolyethoxyalkanols, and derivatives thereof, some of which are described in U.S. Pat. No. 3,281,475. Such agents are nonionic and have between about 7 and 50 oxyethylene units in the molecule. Advantageously, for best dispersibility the agent is present in the coating composition in an amount between about 0.001–0.02 volume percent, on a total liquid basis.

As touched upon hereinbefore, overall coating ingredients may be combined into separate packages, e.g., a two package system with one containing the liquid coating composition precursor, and the other package containing the water-soluble cellulose ether and pulverulent metal; each package may additionally contain some surface active agent, or it may all be in the package with the metal. When the pulverulent metal is in aqueous medium, there is preferably also present in the package a high boiling organic compound. In blending of ingredients, it is always preferable that the surface active agent be present to assist dispersion of the pulverulent metal into the composition.

Other compounds may be present in the liquid coating composition precursor but, even in combination, for some liquid coating composition precursors they are present in very minor amounts. Because of this, they do not too deleteriously affect the coating integrity, e.g., with respect to electro-conductivity and galvanic protection. Thus, some compositions should be substantially resin-free and can be substantially pigment free, i.e., contain little if any, pigment or resin such as 10 grams per liter total of both or less, and should preferably be resin free. Also, since the adherence for the particulate metal to the metal substrate might be achieved by other action, e.g., by the ostensible interaction of a chromium-providing-substance with a high boiling hydrocarbon during baking, these coating compositions need not contain resin, and such coatings that will be subsequently topcoated are virtually always pigment-free.

These other compounds further include inorganic salts and acids as well as organic substances, often typically employed in the metal coating art for imparting some corrosion resistance or enhancement in corrosion resistance for metal surfaces. Such materials include zinc chloride, magnesium chloride, various chromates, e.g., strontium chromate, molybdates, glutamic acid, succinic acid, zinc nitrate, and succinimide and these are all preferably avoided, but if present, are most usually employed in the liquid composition in a total maximum amount of less than 5 grams per liter.

For the metal substrates containing applied coating, the preferred temperature for the subsequent heating, which is also often referred to as curing and which may be preceded by drying such as air drying, is within the range from about 400°F. at a pressure of 760 mm. Hg up to not essentially above about 1,000°F. Such an elevated substrate temperature may be attained by preheating the metal prior to application of the liquid composition. However, such curing temperatures do not often exceed a temperature within the range of about 450°F–700°F. At the elevated curing temperatures the heating can be carried out in as rapidly as about 0.2 second or less but is often conducted for several minutes at a reduced temperature.

Before starting the treatment of the present invention it is, in most cases advisable to remove foreign matter from the metal surface by thoroughly cleaning and de-greasing. De-greasing may be accomplished with known agents, for instance, with agents containing sodium metasilicate, caustic soda, carbon tetrachloride, trichlorethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching.

After heating, the resulting coated substrate of the present invention can be further topcoated with any suitable paint, i.e., a paint, primer, including electrocoating primers, and weldable primers such as the zinc-rich primers that can be applied before, typically, electrical resistance welding, and paints such as enamel, varnish, or lacquer. Since the coated metal surfaces of the present invention can exhibit a desirable upgrading in topcoat adhesion when compared, for example, to the uncoated substrate metal, paints are often applied over such coated substrates. Such paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, ipoxys, acrylics, vinyl, including polyvinyl butyral and oil-wax-type coatings such as linseed oil-paraffin wax paints. The paints may be applied as mill finished.

The following examples show ways in which the invention has been practiced but should not be construed as limiting the invention. In the examples the following procedures have been employed:

Preparation of Test Parts

Test parts are typically prepared for subsequent treatment by immersing in water which has incorporated therein 2–5 ounces of cleaning solution per gallon of water. The cleaning solution is typically 75% by weight of potassium hydroxide and 25 weight percent tripotassium phosphate. The bath is maintained at a temperature of about 150° – 180°F and during cleaning the bath can be mechanically agitated. After the cleaning treatment the panels are rinsed with warm water and dried.

Application of Coating to Test Parts and Coating Weight

Clean parts are typically coated by placing in a wire basket and dipping the basket into coating composition, removing the basket and draining excess composition therefrom with a mild shaking action and then repeating the dipping and draining, when an augmented coating is desired. This draining is then immediately followed by baking or air drying at room temperature until the coating is dry to the touch and then baking, the parts being usually placed on a sheet for baking. Baking proceeds under infrared lamps at an air temperature of about 550°F. unless otherwise specified, for a time up to ten minutes, also unless otherwise specified.

Coating weights for parts, generally expressed as a weight per unit of surface area, are determined by selecting a random sampling of parts of a known surface area and weighing the sample before coating. After the sample has been coated, it is reweighed and the coating weight per selected unit of surface area, most always presented as milligrams per square foot (mgms./sq.ft.), is arrived at by straightforward calculation.

EXAMPLE 1

Into 200 milliliters (mls.) diethylene glycol plus 4 mls. of wetter which is a nonionic, modified polyethoxy adduct having a viscosity in centipoises at 25°C. of 180 and a density at 25°C of 8.7 pounds per gallon, there is blended 350 grams of zinc flake having particle thickness of about 0.1–0.2 micron and a longest dimension of discrete particles of about 15 microns. This blending is accomplished with vigorous high shear agitation for five minutes and no significant foaming accompanies this blending. Separately there is added to 400 mls. of deionized water, 50 grams of chromic acid with moderate mechanical stirring.

To the zinc flake slurry there is slowly added, during moderate mechanical agitation, 300 mls. of a predissolved solution in water containing 2 grams of hydroxyethyl cellulose (HC) thickener; the thickener is a cream to white colored powder having a specific gravity of 1.38–1.40 at 20/20°C., an apparent density of 22–38 pounds/cu.ft., and all particles pass through 80 U.S. mesh. Again no undesirable foam evolution is visually noted during this mixing.

Subsequently, the chromic acid solution is slowly added to the zinc flake/HC thickener blend accompanied by moderate mechanical agitation, and the foam that develops during this mixing is skimmed and measured; likewise, the entire procedure is repeated, but without using the HC thickener. When the foam from the last mixing is skimmed and measured, it is found to be about eight times as great, by volume, as for the mixture prepared with the HC thickener.

Each blend, i.e., the one containing, as well as the one free from, the HC thickener, is used to coat ten grade 8 bolts which are 1-1/16 inches long by about ¼ inch in diameter at the threaded end and have 7/8 inch of threading on the shaft topped by a ⅝ inch smooth shaft section that terminates in the bolt head.

In the case of each blend, the bolts are coated by the augmented coating method as described above and the coating cured for 20 minutes at 550°F. On analysis, as described above, the bolts are calculated to average 1500 mgms./sq.ft. of coating from the HC thickener bath. By visual observation, the bolts coated in the HC bath are seen to have a uniform, very bright and ostensibly desirably adherent coating.

For both the HC bath and the comparative bath, the weight ratio of zinc to chromium, expressed as chromium metal, is 14:1. In the coatings, such ratio is determined by x-ray diffraction on a Porta-Spec manufactured by Pickford Corporation. The x-ray beam is set at the required angle to determine chromium and zinc and is initially standardized with coatings containing known amounts of these elements. The machine is adapted with a counter unit and the count for any particular coating is translated into milligrams per square foot by comparison with a preplotted curve. For the HC bath in the ratio of zinc to chromium on the bolts is found to be in the range of 14:1 to 15:1 for the HC bath, basis two determinations. The coating from the comparative bath however, has only an 8.8:1 ratio of zinc to chromium.

EXAMPLE 2

Into 210 mls. dipropylene glycol plus 4 mls. of the wetter described in Example 1, there is blended 350 grams of the zinc flake described in Example 1. This blending is accomplished with vigorous high shear agitation. Separately there is added to 350 mls. of deionized water, 50 grams of chromic acid with moderate mechanical stirring.

To the zinc flake slurry there is slowly added, during moderate mechanical agitation, 350 mls. of a predissolved solution is water containing 3 grams of the hydroxyethyl cellulose (HC) thickener described in Example 1. Subsequently, the chromic acid solution is slowly added to the zinc flake/HC thickener blend accompanied by moderate mechanical agitation, and the foam that develops during this mixing is skimmed and measured.

Likewise, the entire procedure is repeated, but without using the HC thickener. The foam from the last mixing is again skimmed and measured. The entire procedure is repeated a third time, but without using either the dipropylene glycol or the HC thickener. In this procedure the wetter is blended with the 350 mls. of water minus the predissolved HC thickener and the zinc flake is then directly dispersed into this blend. After addition of the chromic acid solution to this blend, sufficient additional water is added to make up, in volume, for the deleted glycol. Again, foam from the last mixing is skimmed and measured.

The results of this testing is shown in the table below.

TABLE

| Blend | Glycol | HC Thickener* | Foam,mls./liter |
|-------|--------|---------------|-----------------|
| A | No | No | 275 |
| B | Yes | No | 120 |
| C | Yes | Yes | 30–35 |

*Hydroxyethyl cellulose.

The foam reduction in going from blend A to blend C is quite remarkable and unexpected. Further, the reduction in foam generation going from blend B to blend C is highly desirable and was not anticipated. Hence, the presence of the HC thickener even in the glycol-containing blend very advantageously suppresses an undesirable foam problem.

I claim:
1. A composition concentrate, said concentrate being adapted for blending with a liquid coating composition precursor that contains water-soluble inorganic compound, with said concentrate providing excellent foam suppression during blending and thereafter forming a liquid coating composition for application to a metal substrate, said concentrate being chromate-free and containing:
   a. pulverulent metal flake;
   b. between about 0.1–3 weight percent, exclusive of liquid medium, of water-soluble cellulose ether;

and having, c. water based liquid medium, containing water-dispersible organic liquid providing a weight ratio of said pulverulent metal flake to said organic liquid of from about 1:4 to about 4:1, and with said organic liquid being present in an amount sufficient to supply at least about 5 volume percent of said liquid to the total volume of said coating composition.

2. A composition concentrate of claim 1 wherein said cellulose ether is nonionic and is selected from the group consisting of hydroxyethylcellulose, methylcellulose, methylhydroxypropylcellulose, ethylhydroxyethylcellulose, methylethylcellulose and mixtures thereof.

3. The composition concentrate of claim 1 wherein the pulverulent metal flake is supplied in major amount by a metal selected from the group consisting of zinc, aluminum, mixtures thereof and alloys of same, and said water dispersible organic liquid is a compound containing carbon, oxygen and hydrogen and having one or more oxygen-containing constituents selected from the group consisting of hydroxyl, oxo, low molecular weight either, and mixtures thereof.

4. The composition concentrate of claim 3 wherein the concentrate contains a weight ratio of metal flake to water dispersible organic liquid of from about 1:1 to about 3:1.

5. The composition concentrate of claim 1 further characterized by containing between about 0.1-3 percent, basis weight of concentrate exclusive of liquid, of surface active agent.

6. The composition concentrate of claim 1 further characterized by containing up to about 60 weight percent water, basis total concentrate weight, and having water-dispersible organic liquid having a boiling point above 100°C.

7. The method of preparing a liquid coating composition for application to a metal substrate, which method provides excellent foam supresion during preparation and includes the steps of establishing a liquid precursor composition of water soluble inorganic compound in liquid medium, said compound providing chromium as a portion thereof, and said method thereafter including blending said precursor with a chromate-free composition concentrate containing pulverulent metal flake and between about 0.1-3 weight percent, exclusive of the concentrate liquid medium of water-soluble cellulose ether, said concentrate liquid medium being water based and containing water-dispersible organic liquid, wherein the resulting concentrate composition contains a weight ratio of the metallic flake to said organic liquid of between about 1:4-4:1, and with said organic liquid being present in an amount sufficient to supply at least about 5 volume percent of said liquid to the total volume of said coating composition.

8. The method of claim 7 wherein said composition precursor is established at a pH below about 2.5 by blending chromic acid into an aqueous medium.

9. The method of claim 7 wherein said blending imparts above about 100 grams of metallic flake per liter of prepared liquid coating composition.

10. In a liquid coating composition for application to a metal substrate for preparing an adherent, corrosion resistant coating thereon, which composition includes an intimate mixture in aqueous medium of water soluble inorganic compound providing chromium as a portion thereof, said aqueous medium containing 5–50 volume percent based on the total volume of the coating composition, of water-dispersible organic liquid that is a high boiling organic compound having a boiling point above 100°C. at atmospheric pressure, with said coating composition further containing pulverulent metal, the improvement for suppressing foam formation during preparation wherein said composition also contains, in intimate mixture, below about 3 weight percent, basis total weight of said coating composition, of water-soluble cellulose ether.

11. The coating composition of claim 10 wherein said cellulose ether is nonionic and is present in said composition in an amount above about 0.01 weight percent, basis total weight of the coating composition.

12. The coating composition of claim 10 wherein said cellulose ether is selected from the group consisting of hydroxyethylcellulose, methylcellulose, methylhydroxypropylcellulose, ethylhydroxyethylcellulose, methylethylcellulose and mixtures thereof.

13. The coating composition of claim 10 wherein said inorganic compound is chromic acid and said coating composition has a pH below about 2.5.

14. The coating composition of claim 10 wherein the pulverulent metal is supplied in major amount by a metal selected from the group consisting of zinc, aluminum, mixtures thereof and alloys of same, and said high boiling organic compound is a compound containing carbon, oxygen and hydrogen and having one or more oxygen-containing constituents selected from the group consisting of hydroxyl, oxo, low molecular weight ether, and mixtures thereof.

15. The coating composition of claim 10 wherein said pulverulent metal is in flake form and is present in said composition in an amount above about 100 grams per liter.

16. The method of preparing a liquid coating composition of suppressed foam formation in preparation, which composition provides an adherent, corrosion resistant coating on a substrate, and includes an intimate mixture in aqueous medium of water soluble inorganic compound providing chromium as a portion thereof, said aqueous medium containing between about 5–50 volume percent, basis total volume of said coating composition, of water-dispersible organic liquid that is a high boiling organic compound having a boiling point above 100°C. at atmospheric pressure, with said coating composition further containing pulverulent metal, which method for suppressing foam formation comprises blending into said composition during the preparation thereof below about 3 weight percent, basis total weight of said coating composition, of water-soluble cellulose ether.

17. The method of claim 16 wherein said blending provides above about 0.01 weight percent, basis total weight of said coating composition, of said cellulose ether and said ether is nonionic.

18. The method of claim 16 wherein said pulverulent metal is preblended with said water-dispersible organic liquid and at least a major amount of said cellulose ether is admixed with the preblended composition.

* * * * *